United States Patent [19]

Applebaum et al.

[11] 3,715,753

[45] Feb. 6, 1973

[54] COHERENT RANGE AND LENGTH RESOLUTION

[75] Inventors: Sidney P. Applebaum, Liverpool; Bernard H. Geyer, Jr., North Syracuse, both of N.Y.

[73] Assignee: General Electric Company

[22] Filed: May 13, 1964

[21] Appl. No.: 367,610

[52] U.S. Cl. ............................................343/17.2 PC
[51] Int. Cl. .................................................G01s 7/32
[58] Field of Search.343/13, 14, 17.1, 17.2, 17.2 PC, 343/17.5

[56] References Cited

UNITED STATES PATENTS

2,817,832  12/1957  Mathes....................................343/13
3,212,087  10/1965  Blass ......................................343/13

Primary Examiner—Stephen C. Bentley
Attorney—Carl W. Baker, Melvin M. Goldenberg, Frank L. Neuhauser and Oscar B. Waddell

EXEMPLARY CLAIM

1. A radar system for making precise determinations of target range and target length comprising:
   means for providing RF pulses which are separated by equal increments of frequency and time,
   means for transmitting said pulses,
   means for receiving reflections of said pulses from targets within a range interval of interest,
   means for demodulating said reflections with local signals to provide IF signals, said local signals comprising pulses of the same rate and frequency sequence as said transmitted pulses but delayed with respect thereto, and
   means for processing said IF signals to determine their relative phase shifts and to generate a precise measurement of range and length of targets within said range interval of interest.

17 Claims, 6 Drawing Figures

INVENTORS:
SIDNEY P. APPLEBAUM,
BERNARD H. GEYER, JR.

BY *Walter H Warner*

THEIR ATTORNEY.

COHERENT RANGE AND LENGTH RESOLUTION

The present invention relates to the use of radar in the measurement of range and length and in particular to the fine resolution of range and length as measured by radar.

Fine resolution of range to provide a radar profile with fine resolution, or to accurately measure length of a reflector by radar, can be accomplished in a direct manner through the use of high resolution pulses, i.e., pulses of very short duration and correspondingly wide bandwidth. Such an approach presents certain problems centering around the difficulties entailed in handling and processing very wide bandwidths while, at the same time, delivering large amounts of power. For example, using this approach to obtain range resolution of less than 5 feet would require a pulse bandwidth in excess of 100 megacycles. Range resolution of less than 1 foot would require a pulse bandwidth of about 500 megacycles. These relatively large bandwidths would require entire radar systems — exciter, transmitter, antenna, and receiver — with wide bandwidth capability. In addition, these pulses, being very short, would have to be coded with a very large compression ratio in order to increase their energy content to an effective level even for short ranges or for relatively large targets. Even so, the energy they could carry would be far below requirements for many purposes, and well below that available in many other radars.

Any radar system intended to be used for fine length measurements, or fine range resolution, must use a wide spectrum of frequencies. This is unavoidable. However, many of the problems associated with wide bandwidth systems can be circumvented by transmitting different parts of the signal spectrum at different times. This can be done, for example, by transmitting a sequence of pulses in which each pulse is on a different carrier frequency. In such a case the radar system still has a wide "bandspan" or capability of operating over a wide span of frequencies, but need not be capable of simultaneously handling signals of broad bandwidth or signals having a wide spectrum of frequencies.

It is therefore a primary object of this invention to provide an improved radar system for securing more accurate range resolution.

It is a further object of this invention to secure improved radar resolution without excessive increases in pulse bandwidth.

It is another object of this invention to provide improved radar resolution in a manner which is compatible with modern reflector or array radar systems.

It is still a further object of this invention to process radar signals so as to avoid the excessive "instantaneous" bandwidths normally associated with high resolution radar.

It is yet a further object of this invention to provide signals more amenable to correction for propagation path dispersion effects.

These and other objects are achieved by a preferred embodiment of the invention in which are provided a plurality of RF carrier signals each having a frequency different from that of the preceding carrier signal by a fixed frequency difference $\Delta F$. The carrier signals are modulated by locally generated IF signals which are precisely controlled in both frequency and timing to assure that pulses of precise spacing in time and of successively different frequencies are available for transmission. These pulses are then transmitted to be reflected by known targets. After the transmitted pulses have been reflected from the targets and received by the radar, they are each demodulated by signals having frequencies corresponding to those of the original carrier signals, but which have been delayed in time, to provide trains of coherent pulses of common IF frequency. Each pulse in each coherent train of pulses, though interspersed with other trains of other pulses, has a common pulse-to-pulse phase difference $\Theta$. This value $\Theta$ is a function of range. Processing two such trains of interspersed coherent signals makes it possible to measure their relative pulse-to-pulse phase differences, for example $\Theta - \Theta_1$, and therefore to accurately determine the distance between successive reflectors in space. The invention can be considered to involve processing radar signals by time sequentially stepping narrow band signals over a wide frequency band to produce signals which are separated in relatively narrow frequency bands as distinct from processing entire wide frequency bands at one time.

The novel features believed to be characteristic of this invention are set forth in the appended claims. The invention itself, together with further objects and advantages thereof, may best be understood by reference to the following description, taken in connection with the accompanying drawings in which

Figure 1:
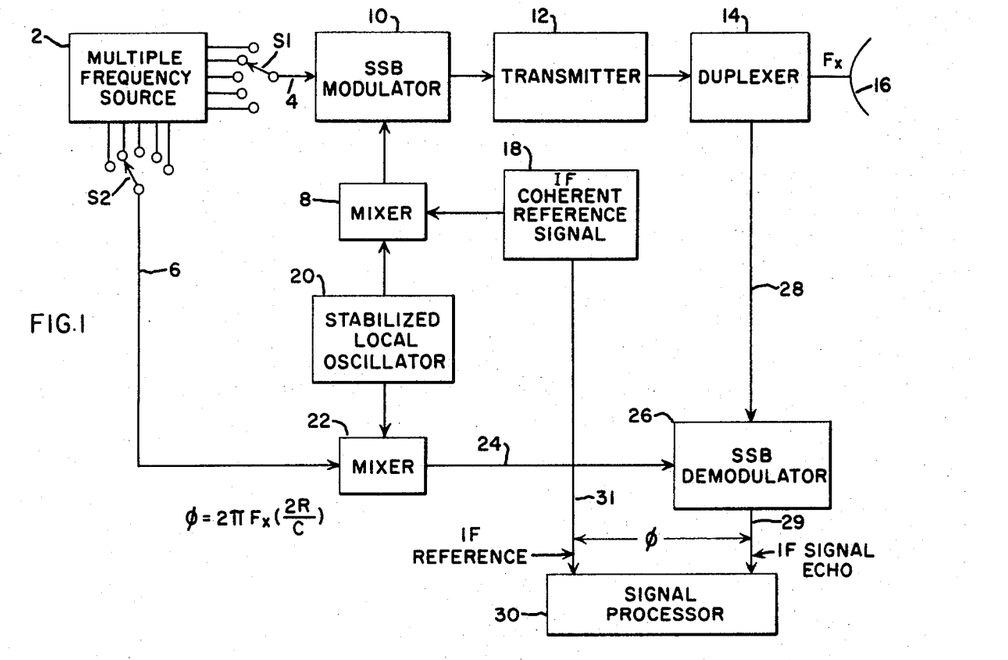
FIG. 1 is a block diagram illustrating an embodiment of the invention.

Turning to FIG. 1, for a description of a preferred embodiment of the invention, we find a simplified block diagram. In one corner of the diagram there is illustrated a block 2 labeled Multiple Frequency Source. This Source 2 represents conventional means for generating a number of signals at carrier frequencies, each of which is separated from each of the other signals by a fixed frequency difference $\Delta F$. Each of these signals can be supplied as needed through switching means S1 and S2 to lines 4 and 6 respectively. The switch at S1 can be set, by means not shown, to step through successive contacts to provide signals on line 4 which are separated by exact amounts both in frequency and in time. The switch S2 will be stepped through successive contacts in the same manner as switch S1 with the difference that the switch S2 will lag switch S1 to provide signals at a later time. This time lapse is chosen so that the signals on line 4 will have had time to be modulated, to be transmitted to and reflected from targets in a predetermined range interval and to arrive back at a common processing point by the time the signals from line 6 arrive at that common point. This delay in time between operation of the two switching devices will be regulated by the radar system in accordance with the minimum range to the range interval of interest, so that fine resolution will be determined only with a range interval or range bin. It will be recognized that the same separation in time between the signals on lines 4 and 6 may be achieved by operating switches S1 and S2 together and introducing means for delaying the signal in line 6 by the desired amount. It will be recognized also that switches S1 and S2 in an operating embodiment will be conventional electronically controlled switches, but in the interest of simplicity and clarity of illustration they have been shown as if they were mechanical switches.

To transmit signals, the system of FIG. 1 modulates the signals available on line 4, with a signal from mixer 8, in the single side band modulator 10. The output signal from 10 then consists of a periodic train of pulses with each pulse on a different carrier frequency. This output signal is amplified in the transmitter 12 and supplied through the duplexer 14 to be radiated by the antenna indicated at 16.

The present invention owes much to the maintenance of phase coherence at proper points throughout working embodiments. In the system of FIG. 1, coherence is maintained by use of an IF reference oscillator at 18, a stabilized local oscillator at 20 and a stable source of multiple frequencies from the source indicated at 2. The IF coherent reference oscillator 18 and the stabilized local oscillator 20 are chosen as sources of highly stable oscillations and may be crystal controlled. The multiple frequency source is stabilized to generate uniformly spaced frequencies, any one of which can be selected as needed either for transmission or for use in the receiving circuits.

The signals on line 6, from the multiple frequency source 2, are mixed with local oscillator signals in the mixer 22 to provide a local periodic train of pulses on line 24 with each successive pulse on a different carrier frequency. The pulses on line 24 are generally of greater time duration (corresponding to time T in FIG. 2) than are the pulses transmitted by the transmitter 12 and are delayed in time, when received at the single side-band demodulator 26, by a period equal to the range delay. The range delay can be expressed as a time period equal to the delay in time between the transmission of signals and the receipt of their leading edge, assuming a reflecting point target at the nearest edge of the range interval of interest.

The signals on line 24 and on line 28 are combined in demodulator 26 to provide trains of IF signals on line 29 which are all of the same IF frequency but which may be separated in time to form more than one distinct coherent pulse train. These trains are supplied to the signal processor at 30 which functions to distinguish between coherent pulse trains having different phase relationships with respect to an IF reference signal from line 31. The processor also integrates all the pulses of each distinct coherent train to provide video signals which can be used to indicate the precise range to a particular target, or more exactly, to a particular point scatterer on the target and thus make it possible to accurately determine the distances between point scatterers on the target.

A more complete understanding of the invention as embodied in FIG. 1 may be derived from a consideration of some of the theoretical aspects of its operation. Considering the case in which there is only a single point scatterer in the range interval of interest, the converted signal at the input terminal to the signal processor 30 will consist of a single train of periodic IF pulses. The phase $\phi$, of each pulse in the train with respect to the IF reference signal will depend on two factors, namely the frequency $F_x$ at which that pulse was transmitted, and the precise range $R$ of the point scatterer, as indicated by the following:

$$\phi = (4\pi R/c) F_x \quad (1)$$

where $c$ is a constant corresponding to the speed of light.

Figure 2:
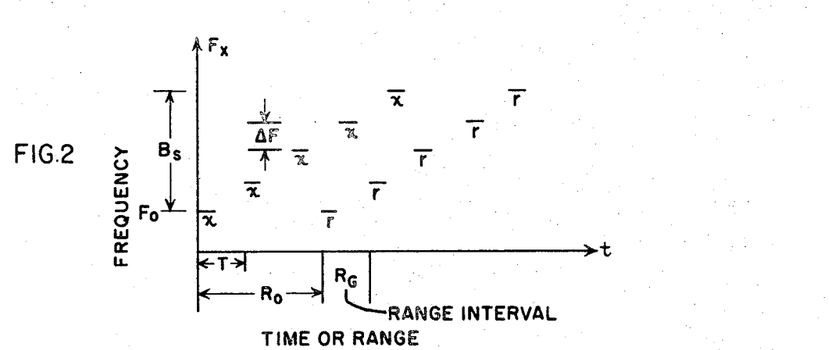
FIG. 2 depicts waveforms of use in understanding the functioning of the invention.

The type of signal processor required to extract fine range or length information depends on the transmitted wave form, that is, the number of pulses transmitted, the wave form of each pulse, and the manner in which the transmitted carrier frequency is changed from pulse to pulse. A typical wave form used with this invention is a stepped frequency wave form which may be shown, as it is in FIG. 2, with frequency plotted against time. Such a depiction of a train of pulses consists of a plurality of small short lines as indicated by the $x$'s, where the short lines indicate by their horizontal length the duration of each pulse and by their vertical separation the amount by which the carrier frequency is incremented between pulses. In the illustration, the carrier frequency is incremented by a constant amount $\Delta F$ between successive pulses. A constant difference $\Delta F$ is chosen largely because a constant difference in frequency greatly simplifies the signal processing. The individual pulses are dimensioned so that sufficient range resolution can be attained to assure a high probability of having only one object in each range cell, where each range cell is typically of one microsecond duration. The time spacing, T, between the leading edges of successive pulses is chosen to give the desired range interval coverage, corresponding to the range interval, $R_G$, shown in the figure. The wave form reflected by and received from a point scatterer in the interval, $R_G$, is shown in FIG. 2 as one of the short lines labeled $r$. The value labeled $R_o$ in FIG. 2 represents the distance to the first edge of the range interval of interest $R_G$. In a typical case, the value of T might be 250 microseconds corresponding to $R_G$ equals 20 miles. In this figure $t$ represents time, $F_0$ represents a minimum frequency of the carrier signals and $B_S$ represents the "bandspan" of the transmitted wave forms.

Consider next the signal received from a stationary point scatterer in the interval $R_G$. The transmitted carrier frequency on the $k^{th}$ pulse is:

$$F_k = F_0 + k\Delta F$$

where $$0 \le k \le N-1 \quad (2)$$

From equation (2) it is clear that the phase of the $k^{th}$ pulse, after conversion to IF, will be:

$$\phi_k = (4\pi R/c) F_k$$
$$= (4\pi R/c)(F_0 + k\Delta F) \quad (3)$$

From equation (3), we note that the signal processor receives a train of pulses at IF in which the phase, $\phi_k$, varies linearly from pulse to pulse with respect to a reference signal. The phase difference, $\Theta$, between successive pulses will therefore be constant and can be expressed as follows:

$$\Theta = \phi_k - \phi_{k-1} \quad \text{where } 1 \leq k \leq N-1$$

$$= (4\pi R/c) \Delta F \quad (4)$$

From equation (4) it is clear that the phase difference, $\Theta$, is directly proportional to the range of the point scatterer and to the frequency increment, $\Delta F$. A periodic train of pulses characterized by a constant phase difference between successive pulses is called a coherent pulse train.

Suppose, now, that there are two point scatterers on the same object, one at the nose and the other at the tail, separated by a small amount in range, i.e., by the projected length of the object. After conversion to IF, the received signal would consist of the superposition of two coherent pulse trains, each having a different value of $\Theta$. Clearly, if we can resolve the two pulse trains on the basis of their $\Theta$ values, we can measure the projected length of the object.

Figure 3:
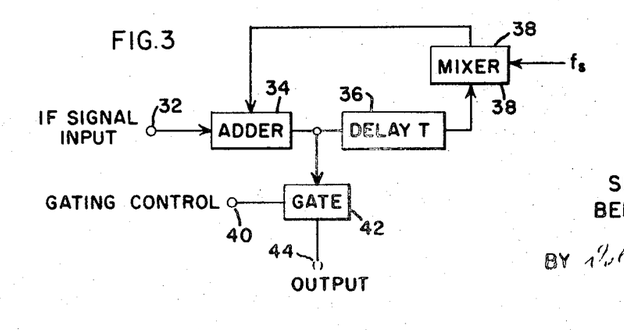
FIG. 3 is a block diagram illustrating an embodiment of a portion of the signal processor shown in FIG. 1.

Coherent pulse trains of the kind described in the preceding paragraph can be readily processed by a signal processor such as that shown in FIG. 3. Such a signal processor will receive IF signals at its input terminal 32, add them to feedback signals in the summing circuit 34, and run the signals through a delay line 36 having a delay T corresponding in time to the spacing between the leading edge of successive pulses, as indicated in FIG. 2. Following the time delay, the pulses are mixed with a scanning signal $f_s$ in a mixer 38 which, in effect, alters the frequency of each pulse before it is added to the next succeeding pulse in the adder 34. This recirculating procedure is continued until the desired number of pulses are received, at which time a gating control, not shown, provides a control signal to the terminal 40 which will operate the gate 42 to permit the desired signals to be supplied over the output terminal at 44. The IF reference signal from line 31 in FIG. 1 can then be used in a conventional manner to designate zero time, so that the output signals on terminal 44 can be related to distance to parts of the target. A processor of the type shown in FIG. 3 is disclosed in more detail in the U.S. Pat. of Sidney Applebaum No. 2,997,650, which has been assigned to the assignee of the present invention.

From the foregoing, it is apparent that the processor of FIG. 3 will coherently integrate coherent pulse trains at IF and simultaneously resolve them in $\Theta$. The degree of resolution that can be obtained depends on the number of pulses in the train. The smallest difference in $\Theta$ that can be resolved is $\Theta_R$ where:

$$\Theta_R = 2\pi/N \quad (5)$$

From Equation (4), we see that this corresponds to a smallest length, $L_R$, that can be measured:

$$L_R = c/2N \Delta F \approx c/2B_s \quad (6)$$

where $B_s$ = "Bandspan" of the transmitted wave form.

Furthermore, since values of $\Theta$ that differ by multiples of $2\pi$ cannot be distinguished, there will be a maximum unambiguous length interval:

$$L_A = c/2\Delta F = NLR \quad (7)$$

Lengths greater then $L_A$ cannot be measured. If, for example, a wave form consisting of 20 pulses were transmitted with a bandspan of 200 mc, the length resolution, $L_R$, would be 2.5 feet. And the unambiguous length interval would be 50 feet.

For length measurement, the output of the signal processor 30 is observed only after the last pulse arrives. In the case of a single stationery point scatterer, this output will consist of a sequence of sin $x/x$ pulses modulated by the shape of the individual pulses in the transmitted pulse train, $p(t)$. The sin $x/x$ pulses repeat at intervals of $1/f_s$ and their peaks occur at times that depend on the precise range of the scatterer. The output envelope can be expressed as:

$$p\left(t - \frac{2R}{c}\right) \frac{\sin \pi N \left(f_s t - \frac{2R}{c} \Delta F\right)}{\sin \pi \left(f_s t - \frac{2R}{c} \Delta F\right)} \quad (8)$$

Figure 4:
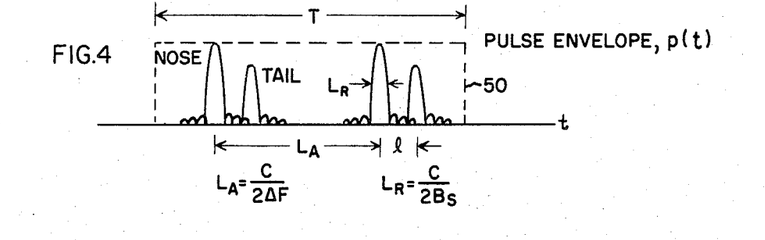
FIG. 4 is a diagram showing the relationships between the signals supplied by the signal processor of FIG. 3.

FIG. 4 illustrates the output signal that could be obtained in real time from a stationary 2-point scatterer object. The dotted line 50 indicates the envelope, $p(t)$, of the individual pulses in the input pulse train. For illustration purposes $p(t)$ is shown as a rectangular pulse of length $\lambda$ where $\lambda$ is assumed to be approximately $2/f_s$. Within the pulse envelope, two signals are indicated, each occurring twice since $f_s \lambda = 2$. One signal is the return from the nose of the object, and the other is the return from the tail. The interval between the sin $x/x$ pulses from the same signal is $1/f_s$ seconds. Although this output is actually in real time, it can be calibrated in distance or length. The width of an individual sin $x/x$ pulse would then be $L_R$, the distances between pulses from the same signal would be $L_A$, and the distance between the "nose" pulse and "tail" pulse would be the projected length of the object, $l$.

Thus far in this discussion it has been assumed that the targets or objects being detected by radar were stationary. for many purposes this assumption is satisfactory, however, target motion will affect the received signal wave form, and if motion is sufficiently large, compensation must be made for it. Assume again that a stepped-frequency pulse train is being transmitted with the frequency of the $k^{th}$ pulse having the same value as in shown in Equation (2), namely:

$$F_k = F_o + k\Delta F \quad (9)$$

After the signal represented by equation (9) has been converted to the IF frequencies, the phase of the $k^{th}$ pulse as received will be:

$$\phi_k = (4\pi R_k/c)(F_o + k\Delta F) \quad (10)$$

Equation (10) is the same expression of phase as the one given in Equation (3) except that in Equation (10) the range $R_k$ is given as a function of $k$ in recognition of the fact that the range to the target changes between pulses.

Over a measurement period which is sufficiently short, the target motion will be essentially linear with some range rate, $V$, so that range may be written as follows:

$$R_k = R_o + kVT \quad (11)$$

where $R_0$ represents the range to the range interval of interest, as previously explained. Inserting this value for range of the $k^{th}$ pulse into Equation (10), we obtain:

$$\phi_k = (4\pi/c)(R_o + kVT)(F_o + k\Delta F) \quad (12)$$

Equation (12) indicates that the phase of the $k^{th}$ pulse is proportional to two factors which individually vary linearly with $k$. This relationship can be expressed in terms of three components, one of which is invariant with $k$, one of which varies linearly with $k$, and one of which varies quadratically with $k$, as follows:

$$\phi_k = \text{const.} + \frac{4\pi}{c} k \left( \overline{R} + \frac{\overline{F}D}{B_s} \right) + \frac{4\pi}{c} B_s D \left( \frac{1}{2} - \frac{k}{N-1} \right)^2 \quad (13)$$

in which $D = (N-1)VT$ = Radial distance traveled by objects in the measurement time, $\overline{R}$ = mean range of the target over the measurement time, $\overline{F}$ = mean transmitted frequency, and $B_s = (N-1)\Delta F$ = bandspan of the transmitted wave form.

In Equation (13), the range, and hence the length information, is contained in the coefficient of the linear term. This coefficient itself contains a term $\overline{F}D/B_s$, that varies with the range rate. This term is a function of the spin rate of the object and if this spin rate is sufficiently low, all scatterers on the same object will have the same range rate and this velocity-dependent term will cancel when length is measured. The quadratic component in Equation (13) indicates that there will be distortion of the output wave form of the processor and if too large that there will be a serious deterioration of the length resolution, $L_R$. A detailed analysis shows that the distortion is not serious if the maximum "quadratic" phase is less than $\pi/2$. This will be the situation if $$D \leq L_R \quad (14)$$

Equation (14) indicates that the radial distance $D$ traveled by the object in the measurement time is less than or equal to the smallest length of target that can be measured. This seems quite reasonable, since it indicates that target motion is negligible if the radial distance traveled by the object in the measurement time is less than the length resolution.

In the case of high-speed targets it often happens that the radial distance traveled by the object in the measurement time is greater than $L_R$, or the length resolution. This may be the case in a space defense system where, for example, in a measurement time of 5 milliseconds with $N=20$ and $T=250$ microseconds, a missile with a range rate of 10,000 feet per second would move 50 feet. This is obviously a considerably greater distance than the length resolution required for useful discrimination data.

To overcome the difficulties indicated in the last paragraph, methods have been devised for measuring the length of high-speed targets with embodiments of the present invention. In one method, the target range rate is measured and this information is used to compensate for target velocity in the length measurement. In another method, which is somewhat more complex, a different waveform is employed and the signal processing is designed to automatically eliminate the effects of target velocity.

To compensate for the effect of target velocity, it is necessary to equalize the quadratic phase component in the pulse train signal as defined in equation (13). It may be noted parenthetically that the effects of ionospheric dispersion are closely approximated by linear time delay characteristics, i.e., quadratic phase distortion. To the extent of that approximation, its effects are identical to the velocity induced quadratic component. This quadratic phase component can be equalized quite readily in the signal processor illustrated in FIG. 3. In the normal processor of FIG. 3, as was previously described, the frequency, $f_s$, by which the signal is shifted on each circulation around the loop, is locked to the loop delay, T, so that $f_sT$ is an integer. If $f_s$ is not locked to the loop delay, it can be shown that a quadratic phase component will be introduced to the signal. Therefore, to equalize a quadratic phase component already present in the input signal, we merely offset the shift frequency, $f_s$, by some amount $f_c$. From a detailed analysis, it has been found that to compensate for the effect of a range rate $V$, $f_s$ must be incremented by an amount which may be expressed as follows:

$$f_c = (4V/c)\Delta F \quad (15)$$

It will be noted from Equation (15) that $f_c$ does not depend on T or $f_s$ and therefore it can be generated independently of the processor loop.

Compensating for target velocity in the foregoing manner has two limitations. First it requires that a range rate measurement be made before the length measurement. Second, in the case of a multiplicity of objects, one value of $f_c$ may not compensate adequately for all range rates. The spread of range rates will be too great if the mutual separating or closing rates of the objects do not satisfy the criterion expressed by Equation (14). For example, with a total measurement time of 5 milliseconds, and desired length resolution of 2.5 feet, the maximum tolerable spread in range rate would be ± 500 feet per second.

Where the expected spread of range rates is too large to use the technique described above, two other methods may be employed. The first of these involves a bank of quadratic phase filters or networks, each matched to a different target velocity band so that all together they span the range of target velocities encountered in the environment. The outputs of all the filters are scanned to find the filter in which the target return is strongest and that return is the desired signal or signature. The second technique is described in the following paragraph and involves the treatment of target range rate automatically in the sense that a previous range rate measurement is not required and the technique makes it possible to handle all range rates simultaneously.

Figure 5:
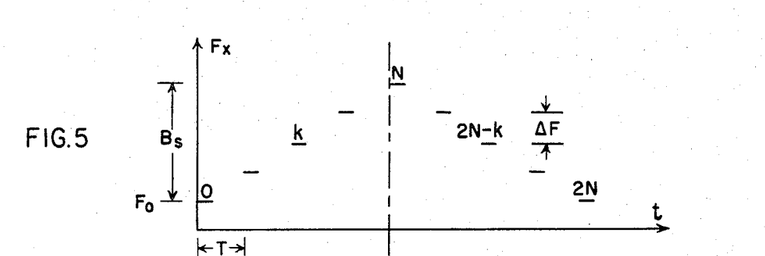
FIG. 5 shows waveforms of a type of use in the description of one embodiment of the invention.

To prepare for automatic velocity compensation using the second technique suggested in the last paragraph, the transmitted waveform must be made somewhat more complex. A suitable group of wave forms is shown plotted in FIG. % where frequency is plotted against time in a manner much like that of FIG. 2. The waveforms shown in FIG. 5 however show the result of increasing the carrier frequency linearly for $N+1$ successive pulses followed by $N$ pulses in which the frequency is decreased linearly. This results in a total of $2N+1$ pulses numbered from 0 to $2N$. It will be noted that pulse number $k$ and pulse number $2N-k$ are transmitted on the same carrier frequency. The phases of these pulses after conversion to IF will be as follows:

$$\phi_k = (4\pi/c)(R_o + {}_{k\textit{VT}})(F_o + k\Delta F) \quad (16)$$

and $$\phi_{2N-k} = (4\pi/c)[R_o + (2N-k)VT](\overline{F_o + k\Delta F}) \quad (17)$$

where $$0 \leq k \leq N$$

In the technique proposed here the train of $2N + 1$ pulses of FIG. 5 is used to form a second or derived pulse train by multiplying pulses $k$ and ($1N-k$) together. The pulse train derived in this manner will have $N+1$ pulses in which the phase of the $k^{the}$ derived pulse will be:

$$\psi k = (8\pi/c)\overline{R}_1(F_o + k\Delta F) \quad (18)$$

where $\overline{R}_1 = R_o + NVT$ = range of the point scatterer at time of pulse '$N$'

The phase of the derived pulse train indicated in Equation (18) will vary linearly from pulse to pulse and the effects of range rate, $V$, have been eliminated.

The pairwise multiplication of the pulses in the original pulse train and the reduction in the number of pulses of the derived pulse train cause a 6db loss in signal-to-noise ratio at the output of the signal processor. This loss, however, is offset by an increase in sensitivity of the phase $\psi_k$, to range. This sensitivity is doubled as will be evident from a comparison of Equation 18 with Equation 3. As a result of the doubled sensitivity, the length resolution, $L_R$, and unambiguous length interval, $L_A$, are half the values previously obtained for a given bandspan, $B_s$, and change in frequency, $\Delta F$. These differences will be apparent if the following equations are compared with Equations 6 and 7:

$$L_R = c/4B_s \quad (19)$$

$$\text{and } L_A = c/4\Delta F \quad (20)$$

An effect of the automatic velocity compensation technique arising from the multiplicative (non-linear) processes is the introduction of spurious signals. These spurious signals appear to be located between the true signals from which they originated. The spurious signals, therefore, should not affect an extended target length measurement, but they will modify the range signature of the target.

In order to accomplish the signal processing indicated above certain requirements must be met. After conversion to IF, the first $N$ received pulses must be stored. When pulse number $N$, indicated in FIG. 5, arrives, it is stored and also multiplied by itself and injected into a processor loop. When pulse number $N + 1$ arrives, it is multiplied by pulse number $N-1$ which is in storage, and the resultant product pulse is injected into the processor loop. Pulse number $N + 2$ is multiplied by pulse number $N-2$, and so forth. All of this processing can be accomplished with a single modified processor of the kind shown in FIG. 0 WITH SUITABLE CHANGES AS INDICATED IN FIG. 6.

Two additions or modifications are required to the basic processor loop of FIG. 3 in order to perform the functions outlined in the last paragraph. The first concerns the operation of frequency shifting in the loop. This is normally accomplished in two separate converters or mixers. In the first of these designated U1 in FIG. 6, the signal in the loop is shifted up in frequency. In the second, designated D1, the signal is shifted down in frequency. Consider now that the DPDT switch in FIG. 6 is thrown to the left or U position. A signal circulating in the loop will first be shifted up in frequency by the amount $f_a + f_s$, from signal source 64, in mixer U1 and will then be shifted down by the amount $f_a$, from signal source 66, by the mixer D1. As a result of this dual shifting the signal will have a net shift upward of $f_s$. It will be noted that $f_a$ is merely a convenience frequency. If, on the other hand, the DPDT switch is thrown to the right or D position, a signal circulating in the loop will be shifted down by the amount $f_s$.

Figure 6:
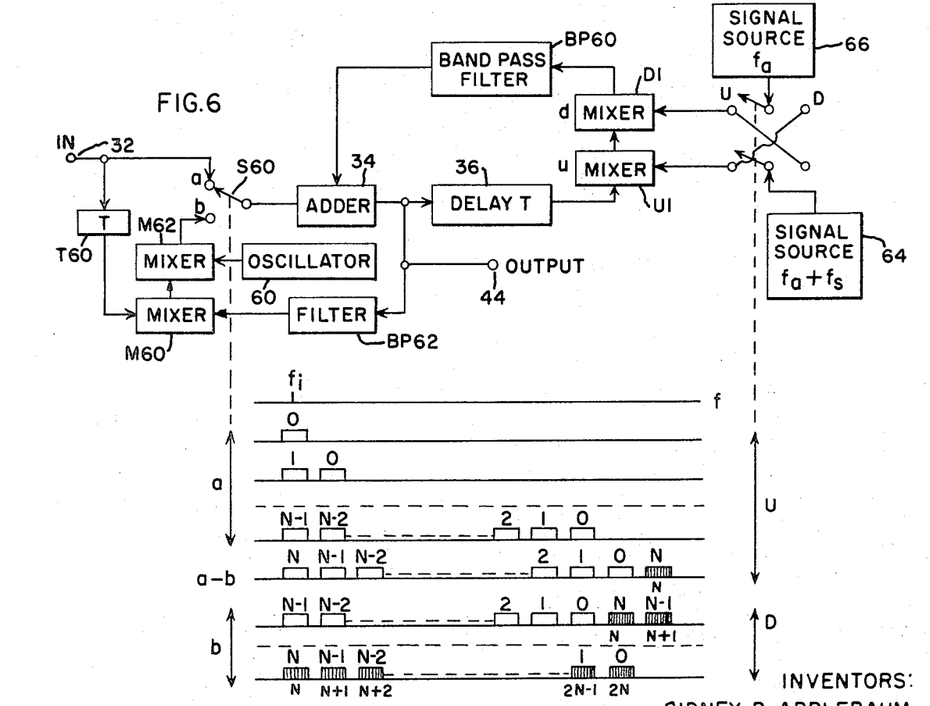
FIG. 6 shows an embodiment of a part of the invention of use in processing signals reflected from rapidly moving targets.

The second addition to the loop of FIG. 3, as shown in FIG. 6, is the circuitry and associated switches shown following the input terminal 32. The input switch S60 has three possible positions. In one position only terminal $a$ is connected to the loop adder 34. In another position both terminals $a$ and $b$ are connected to the adder. In the third position only terminal $b$ is connected to the adder. A bandpass filter BP62 has been provided to select the signal in the loop which is at the frequency $f_i$, the normal loop injection frequency. This signal in the loop is multiplied by the concurrent input signal in the mixer M60, and the sum frequency term of the product is shifted in frequency in the mixer M62 and reinjected into the loop.

The operation of this processor can be explained more fully with the aid of the block diagram and the wave form diagrams shown in FIG. 6. The process starts with the input switch S60 in position $a$ and the DPDT switch in position U. When pulse member 0, as indicated in FIG. 5, arrives, it is injected into the loop at the frequency, $f_i$. It circulates around the loop being shifted up in frequency by $f_s$ thru U1 and D1 and passes through bandpass filter BP60 to arrive at the adder just as pulse number 1 is being injected at the frequency $f_i$. Pulses 0 and 1 are now circulating in the loop at the same time and are separated in frequency by $f_s$ as indicated in the lower portion of FIG. 6. This process continues until the first $N$ pulses are stored in the line, with pulse number $N-1$ at the frequency $f_i$ and pulse number 0 at $f_i + (N-1)f_s$. At this time the input switch S60 is switched to the $a$–$b$ position.

The switch is therefore in the "$a$–$b$" position when pulse number "$N$" arrives. Accordingly, pulse "$N$" is injected into the loop at $f_i$ in adder 34. Through joint operation of the delay line T60 and the narrow band pass filter BP62, which is designed to pass only $f_i$, the pulse N is made available to be multiplied by itself in the mixer M60. The output of M60 is then stepped up in frequency by mixing with a signal from oscillator 60 to $f_i + (N+1)f_s$ and injected into the loop. The product pulse is indicated as a shaded pulse in FIG. 6. The switch S60 is now shifted to position "$b$" and the DPDT switch is thrown to position "D". With the switch S60 in position "b" and the DPDT switch in position "D" the next pulse "$N+1$" will be handled differently. All of the signals in the loop will now be shifted down in frequency by $f_s$ cps on each circulation. When pulse number $N+1$ arrives it is multiplied in mixer M60 by pulse number $N-1$, which is concurrently at the frequency $f_i$. The resulting pulse is shifted up by operation of mixer M62 and is injected into the loop at the frequency $f_i + (N + 1)f_s$. This process is continued until the loop contains all the $N + 1$ product pulses displaced from each other by $f_s$ cps in frequency as indicated on the bottom line of FIG. 6. The outputs of the processor will then be signals suitable for operating a display showing range to a plurality of point targets and, of course, the distances between point targets, or length. Reference may be made to FIG. 4 which illustrates the form of pulses available as output signals as distinct from the pulse envelopes illustrated in FIG. 6. Signals such as shown in FIG. 4 can, of course, be displayed on a cathode ray oscilloscope which is properly coupled to the output terminal 44.

In the interest of simplicity and clarity, the switching circuits shown in FIG. 1 and FIG. 6 have been shown as mechanical switches which might be operated by hand. It will be recognized that suitable electronic switches would be required in actual practice and that use of such conventional electronic switches would not be beyond the scope of the present invention. It will be recognized also that many other modifications of the particular disclosed embodiments of the invention may be made without departing from the true spirit and scope of the invention as set forth in the claims.

What we claim as new and desire to secure by Letters Pat. of the U.S. is:

1. A radar system for making precise determinations of target range and target length comprising:
    means for providing RF pulses which are separated by equal increments of frequency and time,
    means for transmitting said pulses,
    means for receiving reflections of said pulses from targets within a range interval of interest,
    means for demodulating said reflections with local signals to provide IF signals, said local signals comprising pulses of the same rate and frequency sequence as said transmitted pulses but delayed with respect thereto, and
    means for processing said IF signals to determine their relative phase shifts and to generate a precise measurement of range and length of targets within said range interval of interest.

2. A radar system for making precise determinations of target range and target length comprising:
    means for providing phase coherent RF pulses which are separated by equal increments of frequency and time,
    means for transmitting said pulses,
    means for receiving reflections of said pulses from targets within range intervals of interest,
    means for demodulating said reflections with local signals to provide coherent IF signals, said local signals comprising pulses separated by equal increments of frequency and time similarly to said transmitted pulses but delayed with respect thereto by an amount equal to the round trip signal transit time to the near edge of a range interval of interest, and
    means for processing said IF signals to determine their relative phase shifts and thus to generate precise measurements of targets within said range intervals of interest.

3. A radar system substantially as claimed in claim 1 in which said means for providing RF pulses separated by equal increments of frequency and time includes,
    a source of multiple frequency RF signals which are separated in frequency by equal increments, and
    switching means for sampling said RF signals sequentially to provide pulses which are spaced apart both in time and in frequency by equal increments.

4. A radar system substantially as claimed in claim 1 in which said means for providing RF pulses includes,
    means for modulating RF pulses with highly stable signals.

5. A radar system substantially as claimed in claim 3 in which:
    said local signals are derived from said source of multiple frequency RF signals by operation of additional switching means, and
    said local signals are delayed in time to permit said transmitted pulses to make their round trip to a range interval of interest and back before mixing with said local signals.

6. A radar system substantially as claimed in claim 1 in which said local signals are derived by securing samples of RF signals from said means for providing RF pulses and said samples are provided with a time delay equal to the time required for a round-trip by said RF pulses to a range interval of interest and back.

7. A radar system substantially as claimed in claim 1 and embodying means for compensating for high velocity targets in which:
    said means for providing RF pulses separated by equal increments of frequency includes provision that a series of pulses from O – N are separated by equal increments of rising frequency and a series following N and including pulse 2N are separated by increments of decreasing frequency, and
    said means for processing incorporates means to multiply IF pulses derived from said pulses 0 through $N$ by IF pulses derived from said pulses $N$ through 2N to provide a series of $N$ coherent pulses free of errors due to high velocity of the targets.

8. A radar system substantially as claimed in claim 7 in which said means for compensating for high velocity targets includes:
    switching means for coupling said IF signals at frequency $f_i$ into adder means to insert the pulses into a delay loop,
    means in said delay loop to step up the frequencies of the first N pulses by an amount $f_s$ during each circulation in the loop until the first pulse "O" has the frequency $f_i + (N - 1)f_s$ and the $N$th received pulse "$N-1$" has the frequency $f_i$,
    means to control the input circuits of said delay loop upon receipt of said ($N+1$)st pulse, which is pulse N, to step up the frequency of circulating pulses by $f_s$, to insert pulse $N$ into the loop at frequency $f_i$, to multiply pulse $N$ by itself and step the frequency of the resulting pulse up by $(N + 1)f_s$ to provide a pulse having the frequency $f_i + (N + 1)f_s$ so that pulses having frequencies from $f_i$ through $f_i + (N + 1)f_s$ are circulating in the loop, and
    means associated with said delay loop to reduce the frequencies of the pulses circulating in the loop by an amount $f_s$ during each circulation in the loop after pulse N has been received and to multiply each pulse as it reaches the frequency $f_i$ and step the frequency of the product up to $f_i + (N + 1)f_s$ until all the $N + 1$ through 2N pulses have been multiplied by the pulses $N-1$ through 0 to produce a plurality of $N$ pulses in the loop separated by the frequency $f_s$.

9. A radar system substantially as claimed in claim 1 including means for automatically correcting the effects of high velocity in a target including:

means in said means for providing RF pulses to control the RF pulses so that each pulse from the first pulse to the $N^{th}$ pulse is of successively higher frequency and each pulse from the $N^{th}$ pulse to the $2N^{th}$ pulse is of successively lower frequency, and means in said means for processing said IF signals to store said IF signals corresponding to said first pulse to said $N^{th}$ pulse and to multiply the stored signals by said IF signals corresponding to said $N^{th}$ pulse through said $2N^{th}$ pulse, thereby to remove undesired effects of velocity which cause a deterioration of length resolution.

10. A radar system for making precise length measurements comprising:

means for providing a first sequence of pulses separated by equal increments of frequency and time, means for modulating each of said first sequence of pulses, means for transmitting said first sequence of pulses as radar signals, means for providing a second sequence of pulses with each pulse separated in frequency and time from adjacent pulses in a similar manner to said first sequence of pulses, said last named means incorporating a time delay into said second sequence of pulses to provide delayed pulses, means for receiving reflections of said radar signals from targets, means for demodulating said radar signals by mixing them with said delayed signals to provide coherent IF signals, and means for processing said coherent IF signals to provide a precise measurement of length and range of each target.

11. A radar system for making precise range and length measurements comprising:

a source of plural RF signals which are separated by equal increments of frequency, first switching means for sampling each of said RF signals to provide a first sequence of pulses which are equally spaced from each other in time and in frequency, means for transmitting said pulses as radar signals, second switching means for sampling each of said RF signals in sequence to provide a sequence of delayed pulses which are equally spaced from each other in time and in frequency but delayed in time relative to said first sequence of pulses by an amount proportional to the round-trip time for radar signals to illuminate the near edge of a range-bin of interest, means for receiving said radar pulses reflected from targets within range-bins of interest, means for demodulating said reflected radar pulses with said delayed pulses to provide IF signals containing information concerning targets of interest, and means for processing said IF signals to provide accurate determinations of range to targets and lengths of targets.

12. A radar system for making precise range and length measurements comprising:

a source of plural RF signals which are separated by equal increments of frequency, first switching means for sampling each of said RF signals to provide a first sequence of pulses which are equally spaced from each other in time and in frequency, means for modulating each of said pulses, means for transmitting said pulses as radar pulses, second switching means for sampling each of said RF signals in sequence to provide a sequence of delayed pulses which are equally spaced from each other in time and in frequency but delayed in time relative to said first sequence of pulses by an amount equal to the roundtrip time for radar signals to illuminate the near edge of a range interval of interest, means for receiving said radar pulses reflected from targets within range intervals of interest, means for demodulating said reflected radar pulses with said delayed pulses to provide IF signals containing information concerning targets of interest, and means for processing said IF signals to provide accurate determinations of range to targets and determinations of lengths of targets.

13. A radar system for making precise length measurements comprising:

a source of distinct RF signals separated by equally spaced increments of frequency, first switching means for sequentially sampling said RF signals to provide a first sequence of RF pulses separated in time as well as frequency, a source of stabilized signals for use in modulating said first sequence of RF pulses, a transmitter for transmitting said phase coherent pulses as radar pulses, means for receiving reflections of said radar pulses from a selected range interval, second switching means incorporated with delay means for sequentially sampling said RF signals to provide a second sequence of RF pulses, said second sequence being delayed in time relative to the first by a time equal to the round trip time of the radar pulses to the first edge of the selected range interval, means for mixing said second sequence of RF pulses with a portion of said stabilized signals to provide a phase stable local train of pulses, a demodulating circuit for demodulating said reflections of radar pulses with said phase stable local train of pulses to form IF coherent pulse trains, and processing means responsive to IF coherent reference signals and to said IF coherent pulse trains to accurately determine phase relationships between the reference signals and each of said coherent pulse trains to determine precise range to and lengths of targets in the range interval of interest.

14. A high resolution radar comprising:

means for generating a plurality of carrier signals separated in time and frequency by corresponding equal increments, means for modulating samples of said carrier signals to provide radar pulses separated precisely in time and frequency, means for transmitting said radar pulses, means for supplying additional samples of the carrier signals delayed in time by an amount equal to the round trip time required for a radar signal to reach and return from the closest edge of a range interval of interest, means for modulating said additional samples of said carrier signals to provide local signals separated precisely in time and frequency, means for receiving said reflections of radar pulses, means for demodulating the reflections of said radar pulses by use of said local signals to provide coherent if signals, and means for processing said coherent IF signals to provide signals expressive of finely resolved length and range.

15. A high resolution radar comprising:

means for generating a plurality of RF pulses borne on carrier signals and separated both in time and frequency by corresponding equal increments, means for transmitting said RF pulses as radar signals, means for receiving reflections of said radar signals, means for providing local signals having the same sequence of time and frequency as said carrier signals, the beginning of the sequence of said local signals being delayed for a period equal to the time for reflection of the radar signals to be received, means for employing said local signals to demodulate said reflections of the radar signals and provide coherent IF signals, and means for processing said coherent IF signals to provide signals expressive of finely resolved length and range.

16. A high resolution radar comprising:

a source of carrier signals of stable frequencies separated by a fixed frequency difference $\Delta F$ and a fixed time separation T, a source of IF coherent reference signals, a source of stabilized local oscillator signals, means for mixing said carrier signals, said IF coherent reference signals and said stabilized local oscillator signals to provide RF signals in the form of pulses separated in time by equal periods T and by the fixed frequency difference $\Delta F$, means for transmitting said RF signals as radar signals, means for receiving signals constituting reflections of said radar signals, means for demodulating said signals representing reflections, and means for coherently integrating said demodulated signals representing reflections to provide a refined measurement of range and length.

17. A high resolution radar comprising:

a source of multiple carrier signals of stable frequencies separated from each other by a fixed frequency and a fixed time period, a source of IF coherent reference signals, a source of stabilized local oscillator signals, means for mixing said IF coherent reference signals and said stabilized local oscillator signals to provide modulating signals, means for modulating successive ones of said carrier signals with said modulating signals to provide radar pulses separated in time and frequency by respectively equal increments, means for transmitting said radar pulses, means for receiving signals constituting reflections of said radar pulses, means for mixing said stabilized local oscillator signals and delayed samples of said carrier signals to provide demodulating signals, means for mixing said reflections of radar pulses and said demodulating signals to provide at least one train of coherent IF signals, and means for processing said coherent IF signals to provide refined measurements of range and length.

* * * * *